United States Patent
Willaczek et al.

(10) Patent No.: US 9,169,874 B2
(45) Date of Patent: Oct. 27, 2015

(54) PERIPHERAL SEALING ARRANGEMENT

(75) Inventors: Hermann Willaczek, Hemhofen (DE); Henrik Albertsen, Nuremberg (DE)

(73) Assignee: IMO Holding GmbH, Gremsdorf (DE)

( * ) Notice: Subject to any disclaimer, the term of this patent is extended or adjusted under 35 U.S.C. 154(b) by 0 days.

(21) Appl. No.: 13/823,543

(22) PCT Filed: Sep. 13, 2011

(86) PCT No.: PCT/EP2011/065867
§ 371 (c)(1), (2), (4) Date: Jul. 2, 2013

(87) PCT Pub. No.: WO2012/035022
PCT Pub. Date: Mar. 22, 2012

(65) Prior Publication Data
US 2013/0279834 A1    Oct. 24, 2013

(30) Foreign Application Priority Data
Sep. 17, 2010  (DE) .................. 10 2010 046 431

(51) Int. Cl.
*F16C 33/74* (2006.01)
*F16J 15/32* (2006.01)
(Continued)

(52) U.S. Cl.
CPC .............. *F16C 33/74* (2013.01); *F03D 11/00* (2013.01); *F16C 33/76* (2013.01); *F16J 15/3208* (2013.01); *F16J 15/3232* (2013.01); *F16J 15/3276* (2013.01); *F16J 15/3456* (2013.01); *F05D 2240/55* (2013.01); *F16C 2300/14* (2013.01); *F16C 2360/31* (2013.01); *Y02E 10/722* (2013.01)

(58) Field of Classification Search
CPC ...... F16C 33/74; F16C 33/76; F16C 33/7823; F16C 33/7826; F16C 2300/14; F16C 2360/31; F16J 15/3208; F16J 15/3276; F16J 15/3456; F16J 15/3232; F05D 2240/55
USPC ......... 384/147, 477, 482, 484, 485, 486, 607, 384/618; 277/306, 351, 361, 520, 596, 640, 277/641
See application file for complete search history.

(56) References Cited

U.S. PATENT DOCUMENTS 3,020,054 A * 2/1962 Driancourt .............. 277/626
3,652,141 A * 3/1972 Husten et al. ............ 384/623
(Continued)

FOREIGN PATENT DOCUMENTS

DE  103 09 383      9/2003
DE  10 2005 041720  6/2006
(Continued)

*Primary Examiner* — Marcus Charles
(74) *Attorney, Agent, or Firm* — Pandiscio & Pandiscio

(57) ABSTRACT

A sealing arrangement comprising a one-piece, peripheral, elastomeric sealing material for sealing a sealing space, the material containing a bearing-side sealing region and inserted between at least one outer rotatable bearing component and, mutually rotatable about the same center axis, at least one inner rotatable bearing component of a rotary joint, wherein the sealing arrangement is form-lockingly and force-lockingly connected in a detachable and replaceable manner to a structure, namely (I) to a plunge cut in a surface parallel to a horizontal outer surface of one of the inner and outer rotatable bearing components, and (II) to a projecting material protrusion with a bottom surface which is disposed on the bearing side of this material protrusion, as an integral part of the inner or outer rotatable bearing component.

12 Claims, 6 Drawing Sheets

(51) Int. Cl.
*F16J 15/34* (2006.01)
*F16J 15/50* (2006.01)
*F03D 11/00* (2006.01)
*F16C 33/76* (2006.01)

(56) References Cited

U.S. PATENT DOCUMENTS

| | | | | |
|---|---|---|---|---|
| 4,067,155 | A | * | 1/1978 | Ruff et al. .................. 52/105 |
| 4,544,286 | A | * | 10/1985 | Basener .................. 384/486 |
| 4,605,318 | A | * | 8/1986 | Kaiser .................. 384/485 |
| 6,217,031 | B1 | * | 4/2001 | Catalano et al. .............. 277/549 |
| 7,331,761 | B2 | * | 2/2008 | Hansen et al. .................. 416/11 |
| 7,648,041 | B2 | * | 1/2010 | Ueda et al. .................. 277/644 |
| 8,043,012 | B2 | * | 10/2011 | Rogall et al. .................. 384/477 |
| 2006/0182634 | A1 | * | 8/2006 | Kirsch et al. .............. 416/244 A |
| 2011/0103728 | A1 | * | 5/2011 | Cowles et al. ................ 384/484 |
| 2012/0068413 | A1 | * | 3/2012 | Putt et al. .................. 277/306 |

FOREIGN PATENT DOCUMENTS

| | | |
|---|---|---|
| DE | 10 2006 053832 | 5/2008 |
| DE | 10 2008 025 725 | 12/2009 |
| DE | 10 2008 027 890 | 12/2009 |
| EP | 1 920 176 | 3/2009 |
| JP | 4563510 B1 * | 10/2010 |
| WO | WO 2010/043249 | 4/2010 |

* cited by examiner

PERIPHERAL SEALING ARRANGEMENT

BACKGROUND OF THE INVENTION

1. Field of the Invention

The invention relates to a sealing arrangement comprising a preferably one-piece, peripheral, rubber-like sealing material for sealing the sealing space in a rotary joint.

2. Description of the Prior Art

Seals having an inner ring and an outer ring currently available commercially and in use for sealing rotary joints and slewing bearings, differ widely in shape and design, even though the uses are often very similar. The objective is always to protect the rotary joint or slew drive, or, in general, the slewing bearing or rolling bearing, reliably against external influences, for example moisture, wind-borne sand, contaminants or dirt, foreign bodies, etc.

A practical sealing arrangement must also ensure resistance to the internal pressure of lubricant in the bearing. The seal should satisfy the requirements for preventing foreign bodies from getting into the bearing structure of the joint. At the same time, the seal must support the aim of keeping the lubricant inside the bearing, or allowing only small and defined quantities of it to escape from the assembly, as a whole. It therefore must have a reasonable ability to withstand the internal pressure of the bearing caused by the lubricant.

It is the current state of the art that the lubricants, or lubricating agents, used in rotary joints, slewing bearings, and slew drives, come into contact with the seal material.

It is also the current state of the art that the seals that are available commercially and are in use are vulcanizable and can be made by all the established methods for producing seal geometries from elastic, rubber-like materials, for example FPM, Viton, NBR, ECO, HNBR, and the like.

Ordinary sealing arrangements according to the state of the art have in common that they are usually either one-piece or multi-piece, i.e., they consist of at least one sealing component.

Very frequently, various annular sealing strips are inserted in the rotary joint, or are fastened in one or more plunge cuts or grooves in the solid material of the rotary joint, or on the slew drive, such that fixation occurs. The fixation is brought about in such cases by inserting the elastic seal material into a groove present in the (metallic) solid material of the assembly to be sealed. This groove is often made by chip-producing machining as a consequence of so-called "plunge-cut turning" during the production of the rotary joint or bearing.

It is often the case that a plurality of such grooves, or plunge cuts, are present in the overall assembly to be sealed. There are frequently at least exactly as many of these grooves as there are elastic sealing strips to be inserted and fixed in the assembly.

The fixation of the sealing strips, or sealing profiles, in the aforesaid grooves, or plunge cuts, is normally accomplished, on the one hand, by means of a form lock, since the elastic springs or lips of the sealing strips, or sealing profiles that are inserted in the grooves, often have a barb-shaped profile geometry or geometries, and also, on the other hand, by virtue of the fact that when the rotary joint is operated as intended, any deformation forces act on the seals generally perpendicularly to the insertion axis of the groove, and thus not in the direction in which the profile geometry, or geometries, of the sealing ring would be pulled out of the groove or plunge cut.

Moreover, the fixation of the sealing arrangement in the metallic solid material can usually be cancelled by the application of force. This means that by applying a given pulling force, which must act in the opposite direction from the force exerted to insert the seal into the solid material, the practitioner or skilled person can disengage the inserted seal from the metallic assembly (rotary joint, slew drive or, in general: slewing bearing).

Due primarily to this fact, according to the known state of the art, that portion of the sealing profiles which is to be inserted in a groove, or plunge cut, is configured as barb-shaped.

However, it is the case according to the known state of the art that each seal is fixed in the solid material of the rotary joint, or slewing bearing, at at least one location, so as not to depart from the fixed position when operated as intended. The sealing effect is respectably good, as a rule.

It is often seen at present for an elastic portion of the described profile geometry, or geometries, of the sealing arrangement to be fixed to the one rotating part of a rotary joint and for another portion of the same sealing arrangement to be fixed to the other rotating part of the rotary joint, and for the sealing effect to be created by the interaction of all the sealing components involved in the assembly as a whole (which are, for example, a first elastic seal, an additional high-grade steel band, an additional tension spring band and a second elastic seal, plus any third elastic sealing components that may desired).

For example, EP 1 920 176 B1, based on DE 10 2005 041720 A1, describes a successful arrangement of this kind for sealing a rotating joint in which the sealing arrangement consists of many individual components, each extending annularly, and in which the sealing ring is fixed in the aforesaid manner to one of the rotating parts. As is readily apparent in that document, the particular groove or plunge cut for fixing the seal in the bearing components can be disposed either in the same direction as the sealing gap or perpendicular to the sealing gap.

DE 103 09 383 A1 also pertains to an annularly extending peripheral sealing ring that is fixed to one of the rotating parts in the aforesaid manner. In this case, the barb-shaped portion is pressed into a groove or a plunge cut disposed, perpendicular to the sealing gap, in one of the rotating bearing components. According to this solution, a second peripheral element is needed for additional fixation of this seal in the horizontal direction.

DE 10 2006 053 832 A1 should also be cited in this connection. There, the subject matter is a one-piece peripheral sealing element in which, as noted above, a portion of the seal is pressed into a groove, or plunge cut, arranged in one of the rotating bearing components so as to be perpendicular to the sealing gap.

According to the current state of the art, therefore, sealing arrangements are very often encountered in the field in which the plunge cut, or the groove, is located either in the gap to be sealed between two mutually rotatable elements, specifically so that the groove or plunge cut is perpendicular to the gap, such as, for example, the small gap seal located on the bearing side that is disclosed in DE 10 2005 041 720 A1; that seal, however, is not able to develop a sealing effect on its own, but for that reason is instead used only in an auxiliary capacity and in conjunction with other, larger sealing arrangements.

Alternatively, in the current state of the art, such one-piece peripheral refinements of sealing arrangements can be encountered in the field in which the plunge cut or groove lies in the direction of the gap. In particular, German applications DE 10 2008 025 725 A1 and DE 10 2008 027 890 A1 relate to such sealing systems, in which a groove or, better, a plunge cut, lies in the same direction as the gap. Here again, the geometries of the sealing profiles are always sharply asymmetrical and rest against the opposite rotating part or the opposite rotating bearing component at several points.

WO 2010/043249 A1, which also describes a one-piece peripheral sealing component, is also very striking. Here again, it is quite clear that a barb-shaped portion is present and is pressed into the plunge cut disposed in the direction of the sealing gap.

It is clearly apparent from an examination of WO 2010/043249 A1, as well as DE 10 2008 025 725 A1 and DE 10 2008 027 890 A1, that each of these solutions includes upper and lower sealing lips which rest against the opposite bearing components in order to seal there, and which, upon displacement of the bearing, can deform upwardly or downwardly toward each other to compensate for bearing play, the upper sealing lip then being pushed upwardly and the lower sealing lip being pushed downwardly. In all cases, however, this upper and lower sealing lip not only provides a sealing effect, but additionally serves to fix the particular bearing assembly against being pushed out axially. Nevertheless, this fixation is present only if the bearing play (i.e., the size of the gap between the inner and outer rings) is not too great. The greater the gap size, the greater the degree to which the strength of the fixation of the seal in the plunge cut depends on how well the barbs remain in place in the plunge cut. This is disadvantageous, particularly if the internal pressure in the bearing increases sharply.

Common to all of the aforesaid solutions is the fact that they can be used, for example, to seal rotary joints employed in wind power installations—for example, to seal rotary joints in the azimuth bearing, tower bearing, as a rotor bearing, or also as a bearing for adjusting the rotor blades. Other types of use in this area of application is also conceivable, however.

In recent years, it has been increasingly desired in practice for such sealing arrangements chiefly to have a profile geometry, or geometries, that can be inserted between the two rotating parts, that provide good fixation, and that achieve a very good and, above all, long-lasting sealing effect. A major problem with many of the aforesaid sealing arrangements is that their intrinsically good sealing effect stands or falls according to how stably, or well, the seal remains in place in the installed position. Many of the current sealing systems fail during operation because the sealing arrangement is pushed out of the installed position as a result of too high an internal pressure in the bearing (due to too much lubricant, for example).

It is always highly disadvantageous in practice if the seals drop out of the rotary joint, since the whole installation breaks down as a result. In particular, the barb-shaped portion of the seal will occasionally, or after deforming, drop out of the plunge cut of the rotary joint, or will be pushed out axially due to excessive lubricant pressure. True, all of the above-cited solutions are designed to last for many years under severe weather conditions and to seal reliably, nonetheless. But practical experience has shown that none of the aforesaid seals constitutes a simple sealing solution, or that due to their inadequate fixing capabilities, the sealing solutions lose their positional stability in the seal, or are expelled from it outright after some periods of operation.

Particularly in the case of multi-piece solutions, additional complexities arise during installation (since a number of individual parts have to be installed). This costs time and money in practice.

In particular, the last three technical documents cited, WO 2010/043249 A1, DE 10 2008 025 725 A1 and DE 10 2008 027 890 A1, are very similar in geometry and therefore present the problem that they run the risk of losing their positional stability during operation, that is, they may be pushed out of the bearing while the installation is operating, due to excessive deformation or too high an internal pressure in the bearing, transmitted outward through the sealing space or sealing gap. Even if this process occurs insidiously, after a given time it will result in a breakdown of the rotary joint to be sealed, or of the associated installation, as a whole. This, too, costs time and money in practice.

In documents DE 10 2008 025 725 A1 and DE 10 2008 027 890 A1, representing the current state of the art, it is the case in particular that no additional arrangement to protect the seal against axial expulsion is present on the side of the bearing on which the seal is fixed in a plunge cut. Assuming that the internal pressure of the bearing is too high due to lubricant, then a seal according to the two solutions just described is protected against axial expulsion only by the barb-shaped configuration of the seal in the plunge cut. In practice, this is far from adequate to guarantee reliable positional securement of the seal. Such a desirable type of securement does exist, to some extent, in WO 2010/043249 A1—referring, here, to an annular groove similar in shape to the sort of tongue and groove securing arrangement commonly used in sturdy types of construction—but it is far from sufficient to ensure reliable positional securement of the seal against axial expulsion due to excessive pressure from the center of the bearing.

What is actually needed, in the view of the practitioner, is a one-piece solution (fewer parts means faster installation, less complexity, etc.) that extends all the way around the rotary joint and is made from the conventional sealing materials—where appropriate, even a magnetizable or magnetic elastomeric material that remains very securely in the seal. In particular, the practitioner requires a sealing arrangement that is simply held firmly in the seal by virtue of the suitably rational configuration of the geometry of the bearing component. Ideally, not only is the seal held firmly, but its cross-sectional profile is designed such that with increasing pressure from the direction of the sealing space to be sealed, i.e., from the direction of the interior of the bearing, an increasing counterforce is also exerted that counteracts axial expulsion. The practitioner therefore requires a sealing solution which, in effect, "clings" to its location when the pressure from inside the bearing increases and threatens to push the seal out of the bearing.

Taking these disadvantages into account, the task that presents itself is to create a sealing arrangement that is as optimal as possible and offers the best possible positional stability. The uppermost goal is to create a low-cost, versatile and one-piece solution for sealing rolling bearings, slewing bearings, rotary joints, slew drives, etc. In particular, the seal should preferably be suitable for use in rotary joints of wind power installations.

SUMMARY OF THE INVENTION

To reduce the above-cited disadvantages of the current state of the art and to provide a versatile sealing solution that offers maximal positional stability, particularly against expulsion from the bearing, the present invention, in particular, offers advantages and features that make for substantial improvement.

The disadvantageous problems of the conventional prior art can be solved, in particular, if the sealing arrangement according to the invention, or the element for sealing the assembly to be sealed, is provided with a geometry such that it is always able to remain in place, integrated in the structure as a whole, i.e., without dropping out, on its own and without the involvement of other components, both when the rotary joint is operating and during idle periods.

A primary task at all times is to seal the to-be-sealed opening by means of the inventive arrangement. This can be achieved particularly by the advantageous shaping of a so-called material protrusion on one of the bearing components, for example on the outer ring in which the sealing arrangement is fixed in a plunge cut.

DESCRIPTION OF THE PREFERRED EMBODIMENTS

Figure 1:
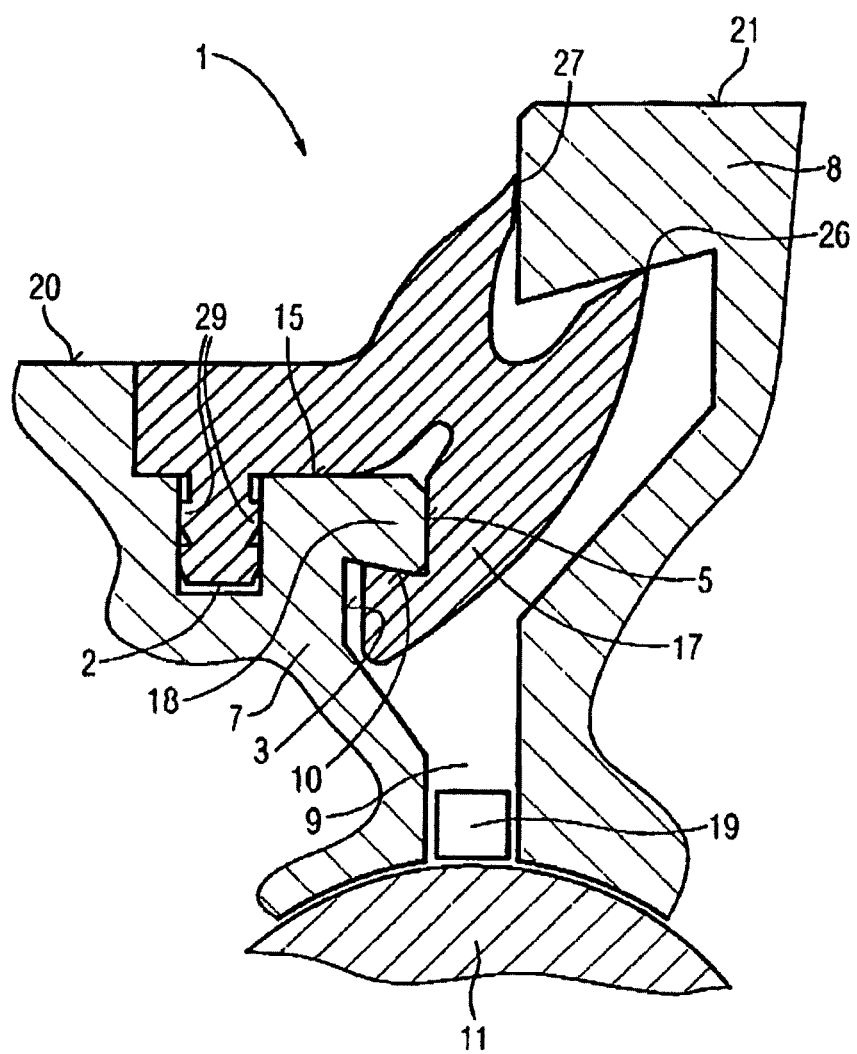
FIG. 1 is a sectional view showing a preferred embodiment of the invention sealing arrangement.

The sealing arrangement, according to the invention, sealing the sealing space or bearing gap, is made from a one-piece, peripheral, rubber-like sealing material. The main component of a pressure load from the bearing is absorbed by a bearing-side region of the seal. The seal is inserted, for example, between the outer ring and the inner ring of a rotary joint, the seal being equally well suited for use in rotary joints consisting of multi-piece outer or inner rings. To ensure the replaceability of the seal during field maintenance without the elaborate necessity of replacing the entire bearing, the sealing arrangement can be removed from, and put back into, the plunge cut in which it is fastened (for example, in order to replace the old seal with a factory-new one). The sealing arrangement is not fixed irretrievably in a groove, but is instead detachably and replaceably connected, an arrangement referred to as a form-locking and force-locking connection. Form-locking, on the one hand, due to the geometry of the plunge cut; force-locking, on the other, due to the barb-shaped portions of the seal profile. The aforesaid plunge cut lies, in known fashion, in the direction of the bearing gap, i.e., in a surface parallel to the horizontal outer surface of the rotatable bearing components.

A characteristic feature of the invention is a material protrusion, for example, on the outer ring, in which the plunge cut is provided and against which, consequently, the sealing arrangement also sits. This material protrusion is not an annular groove of the usual kind, but rather a geometry that projects into the sealing space and to the bottom face of which—meaning the bearing-side bottom face—the sealing arrangement clings form-lockingly in such a way that it withstands the lubricant pressure in the bearing in every situation and installed position. Only by virtue of the fact that this material protrusion projects toward the center of the bearing and is embraced on its bearing-side bottom face by the seal, is it possible for a counterforce counteracting axial expulsion from the seal to be developed in the bearing. Because the seal rests areally rather than punctiformly against this bearing-side bottom face, the counterpressure that can be generated is higher than if the seal were merely in point contact with the surface. (The counterforce that can be generated in this way is the product of the pressure and the area of this surface.)

The aforesaid "clinging" effect, which is also desired according to the invention, is preferably produced, above all, when the aforesaid material protrusion, or, more generally, a material undercut disposed in the bearing gap and on the bearing part to which the seal is primarily attached, is situated where the seal can counteract the greatest axial force. Ergo, the material undercut, or the material protrusion itself, must be located in the bearing gap to exert maximal effect. The clinging effect would not be as good if the material undercut, or the material protrusion, were placed outside the bearing gap. Still less would the clinging effect be as good if the material undercut, or the material protrusion, were placed on a surface perpendicular to the bearing gap. The aforesaid "clinging" effect is especially high when the material protrusion juts out toward the opposite rotatable bearing component (that bounds the bearing gap on the opposite side).

The sealing arrangement according to the invention is stabilized in its position by the fact that the sealing arrangement rests, for example, against additional surfaces of the (optionally multi-piece) outer ring and of the (optionally multi-piece) inner ring. It possesses a plurality of sealing lips that rest against the opposite side of the bearing (i.e., for example, against the inner ring), which, however, possesses constant contact with the oppositely disposed, second rotatable bearing component such that all the contact points, or contact surfaces, are either above the horizontal outer surface of the first rotatable bearing component, or below the horizontal outer surface of the first rotatable bearing component (the outer ring, for example). At least two sealing lips of different widths can be provided. In this way, the sealing arrangement can be well adapted to the geometry or the surfaces of, for example, the second rotatable bearing component. The surfaces of the opposite, second rotatable bearing component preferably are contacted substantially completely.

This configuration cancels the disadvantage of the documents cited in connection with the aforesaid prior art, i.e., document 10 2008 025725 A1 and documents DE 10 2008 027890 A1 and WO 2010/043249 A1, namely that the strength of the fixation of the seal in the bearing depends substantially on the size of the bearing gap. In the present invention, the strength of the invention is substantially dependent on the fixing effect of the embraced material protrusion.

To ensure that the surfaces are as planar as possible, the sealing geometry is adapted to the shape of the bearing component (the outer ring, for example) in such a way that the top edge of the sealing arrangement is approximately flush with the horizontal outer surface (of the outer ring, for example) in which the material protrusion of the sealing arrangement exists. As another feature, the sealing arrangement can be multi-piece if, for example, in addition to the one-piece, rubber-like material of the sealing arrangement, at least one peripheral ring element in the form of a tension spring arrangement is introduced at the top edge of the sealing arrangement. This further enhances the positional stability of the sealing arrangement. A further option for additional fixation of the sealing arrangement is to provide additional screw or rivet connections, which are introduced into the bearing component (the outer ring, for example) from above and serve to hold down the top edge of the sealing arrangement. This is usually achieved by means of a plurality of peripheral screws or rivets, which are sunk into the bearing component wherever the seal is to be fixed. For example, the groove or the plunge cut (in the outer ring, for example) can then be dispensed with entirely, if the peripheral sealing arrangement is fixed to the bearing component by means of screws or rivets.

The barb-shaped fixing portion of the sealing arrangement then can be eliminated as well, if circumstances are appropriate.

Those surfaces, or edges, of the bearing components (of the outer ring, for example) into which the sealing arrangement is inserted, or which are in the immediate vicinity of the sealing arrangement, can be implemented as non-metallically or metallically coated. Such a coating serves to protect against corrosion, and as surface protection, to protect against abrasion, mechanical damage, scratches, etc. As can be seen in the accompanying drawings, it is immaterial whether the other surfaces or edges, of the outer ring, or those of the corresponding (oppositely disposed) inner ring, extend obliquely or are always orthogonal. The primary consideration from a practical standpoint is that slanted surfaces exist at the locations which the sealing lips of the sealing arrangement rest against, or confront. Slanted surfaces are also advantageous where the material protrusion, or material undercut, rests against the seal.

A further essential characteristic of the sealing arrangement according to the invention is a "joint-like" version, which is realized by means of an approximately central tapered region. The taper of the seal is located where a top and bottom recess, or recesses, in the sealing material, which are referred to as "deformation spaces," enable the seal geometry to deform. The center of this taper region is roughly in the middle of the taper region. In the event of radial positional changes of the mutually rotatable bearing components, for example, if changes in the bearing load cause the inner ring to move toward the outer ring, thus reducing the bearing gap, the seal is deformed in such a way that a portion of the sealing arrangement, for example, the top, is pushed toward the outer ring, whereas the bottom portion of the sealing arrangement remains essentially positionally stable due to its fixation on the material protrusion. This relative movement then produces a torque in the seal material, resulting in a joint-like movement about the center of the taper region. For this reason, the taper region, or the center of the taper region, acts approximately as a resilient joint. The resilient joint serves to compensate for radial positional changes of the mutually rotatable bearing components.

Turning again to the taper region, it has been found that the radius of the center of the taper region, with respect to the center axis of the rotary joint, can be smaller than the radius which the area of the outer radial surface of the outer rotatable bearing component (the outer ring, for example) has to the center axis of the rotary joint. The radius of the center of the taper region with respect to the center axis of the rotary joint can, however, be greater than the radius which the area of the inner radial surface of the inner rotatable bearing component (the inner ring, for example) has to the center axis of the rotary joint.

The upper deformation space can be bounded in its axial extent approximately by the plane defined in space by the axial surface bounding the outer bearing component, i.e., for example, the horizontal outer surface of the outer ring. The lower deformation space can therefore be, for example, beneath this plane.

Turning again to the material protrusion, it has been found that the seal material embraces the material protrusion, which is understood to be an integral part of the bearing component in which the peripheral seal is inserted (for example, as an integral part of the outer ring), without bracing itself against the adjacent surface and without entering into a force-locking connection with a radial sealing surface located in the sealing region. As stated above, the fixing action is largely attributable to the fact that the bottom-side, i.e., bearing-side, surface, acts as an abutment against axial expulsion (for example due to grease/lubricant pressure). A nearby radial surface, therefore, could not act as an abutment.

In an alternative embodiment of the invention, a bearing assembly with a sealing arrangement comprises:
- a rotary joint having at least one outer ring rotatable about an axis of rotation and at least one inner ring rotatable about the same axis of rotation;
- a gap formed between the outer ring and the inner ring;
- at least one sealing element disposed at, or in, the gap and sealing the gap peripherally, substantially fluid-tightly, with respect to the environment;
- wherein the outer ring and the inner ring comprise at least one formation extending at least partway along the ring circumference and configured so as to detachably fasten the sealing element;
- wherein the at least one sealing element is provided with a cross section designed such that the sealing element is in substantially form-locking connection with the formation present on the outer ring and/or inner ring.

Due to the presence of a form-locking connection of the sealing element to the bearing assembly, no connecting elements for fastening the sealing element are needed. Moreover, secure seating of the sealing element is also ensured when the rotary joint is being operated. Nevertheless, the sealing element can be replaced in a simple manner during maintenance, or in the event of damage.

In a further embodiment of the invention, the formation present on the outer ring and/or the inner ring is provided with an undercut and the shape of the cross section of the sealing element comprises a corresponding undercut, such that the form-locking connection is formed by the interaction of two undercuts, particularly so as to keep the sealing element from detaching in the event of an overpressure inside the gap.

Thus, in a favorable manner, a form-locking connection is created between the sealing element and at least one of the rings of the bearing assembly, so the gap is well sealed in the direction of exertion of the overpressure. Shaping the formations as undercuts has the effect that the tightness of the connection increases with increasing pressure because of the form lock.

In a further embodiment of the invention, the cross section of the sealing element comprises at least two sealing lips, which rest against a contact surface of the outer ring and/or inner ring such that a labyrinth seal is formed, particularly such that the sealing effect of the sealing element with respect to the gap is preserved when the outer ring and the inner ring are moved relative to each other.

The forming-on of two sealing lips advantageously makes it possible to create a labyrinth effect that will achieve good sealing action, including as a rubbing seal, for rings that are moved in relation to each other.

In a further embodiment of the invention, the outer ring and/or inner ring have a plunge cut, or a recess, in which a, particularly barb-shaped, fixing portion of the sealing element engages, thereby additionally securing the form-locking connection between the sealing element and the inner ring and/or outer ring.

An additional fixing portion offers the advantage that the form-locking connection can be fixed to the outer ring and/or inner ring by means of two structures arranged in a pincer-like manner. The form-locking connection is further improved thereby. The additional securement of the sealing element can also be provided in a plunge cut or recess that can be produced in a simple manner.

In accordance with the above-described features, besides other advantages, the fixation in the rotary joint, or rolling bearing, and the positional stability of the surrounding sealing arrangement, are substantially improved in comparison to current prior art solutions.

Further features, characteristics, advantages and effects based on the invention will emerge from the following descriptions of a preferred embodiment of the invention, and other advantageous embodiments of the invention, and from the drawings. Referring to the drawings:

FIG. 1 is a first view of the sectional geometry of a one-piece version of sealing arrangement 1, looking at the cross-sectioned surface of a cut segment; this is a section through a rotary joint 1 that can utilize ball-, roller-, cone-, drum-shaped rolling elements 28 or sliding components, or a hybrid form thereof. The sealing arrangement according to the invention is fixed by means of a plunge cut 2 and a material protrusion 18 on the one bearing component, and is fixed by abutment of upper sealing lips 26; 27 against the opposite bearing component.

Figure 2:
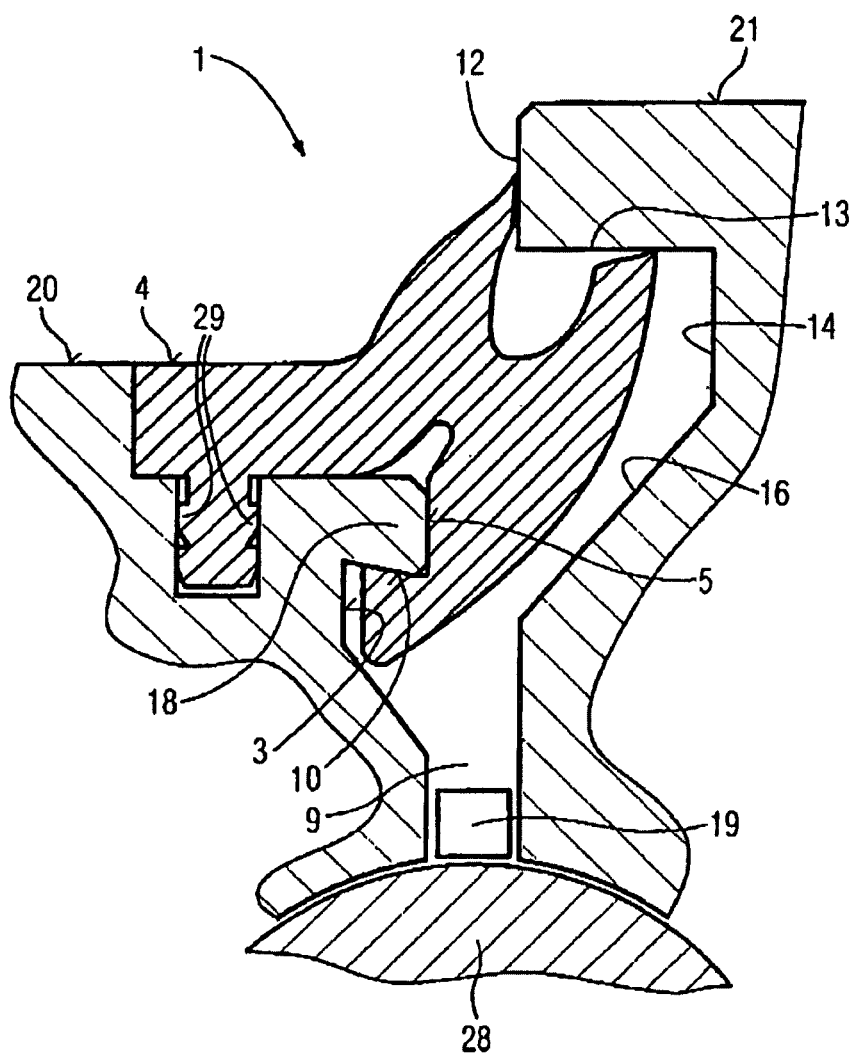
FIG. 2 is a sectional view showing an alternative embodiment of the sealing arrangement of FIG. 1.

FIG. 2 shows another exemplary embodiment of this sectional geometry of this one-piece version of the sealing arrangement 1, in which the contours, especially as regards the sealing space 24, are altered slightly in contrast to FIG. 1, in that a surface 13 is no longer slanted.

Figure 3:
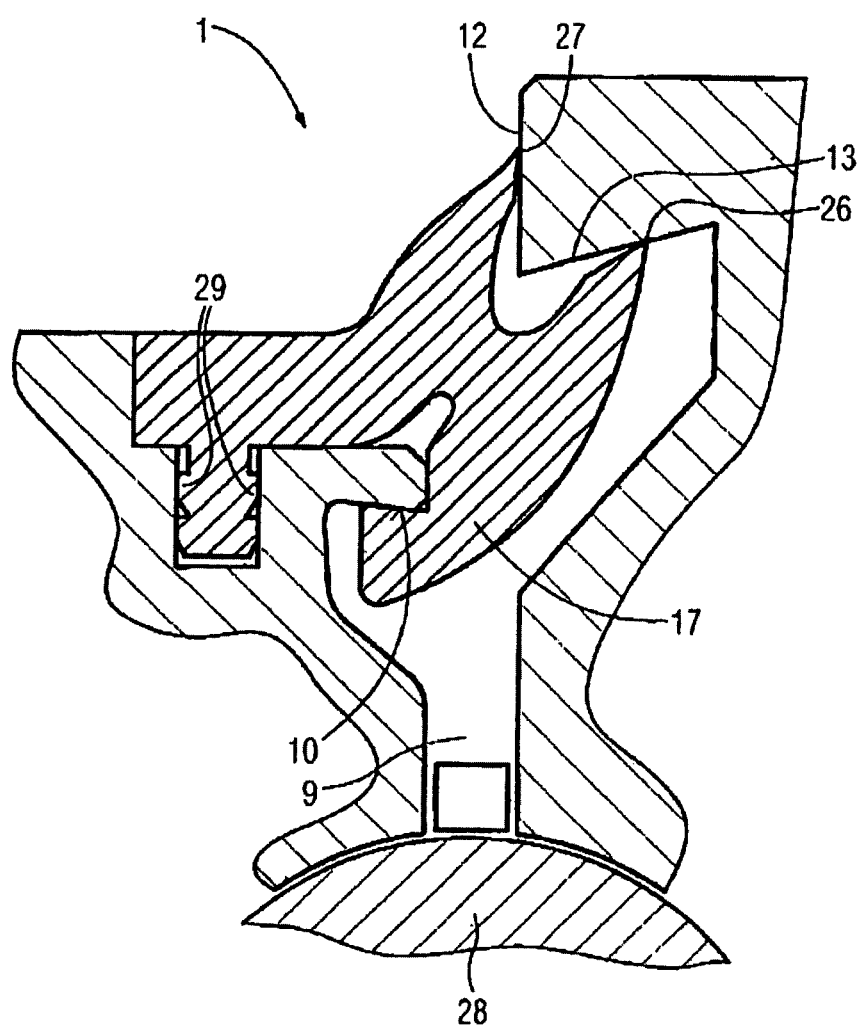
FIG. 3 is a sectional view of an alternative embodiment of sealing arrangement.

FIG. 3 shows a variation of the surfaces bounding the sealing arrangement 1 in the region of the material protrusion or material undercut 18. It will be noted in particular that the arrangement according to the invention is not dependent on perpendicular or rectilinear surfaces 3; 5, but can also produce its effect with hybrid shapes.

Figure 4:
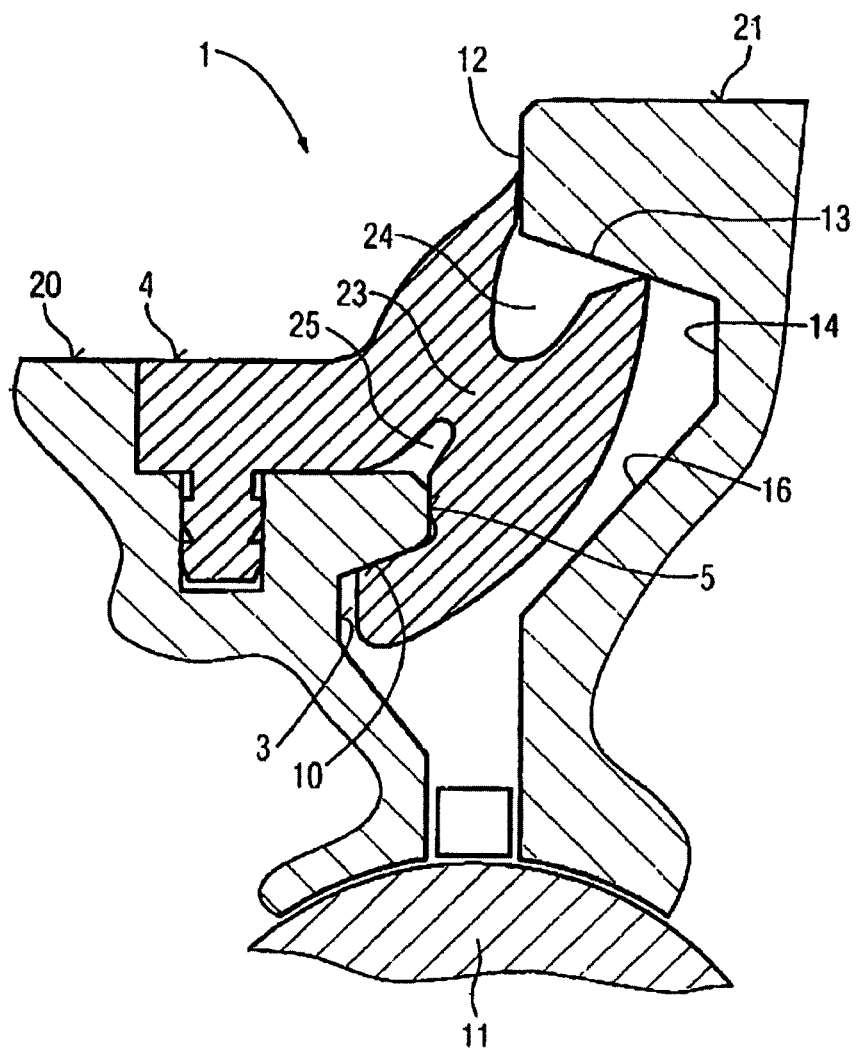
FIG. 4 is a sectional view of a further alternative embodiment of sealing arrangement.
Figure 5:
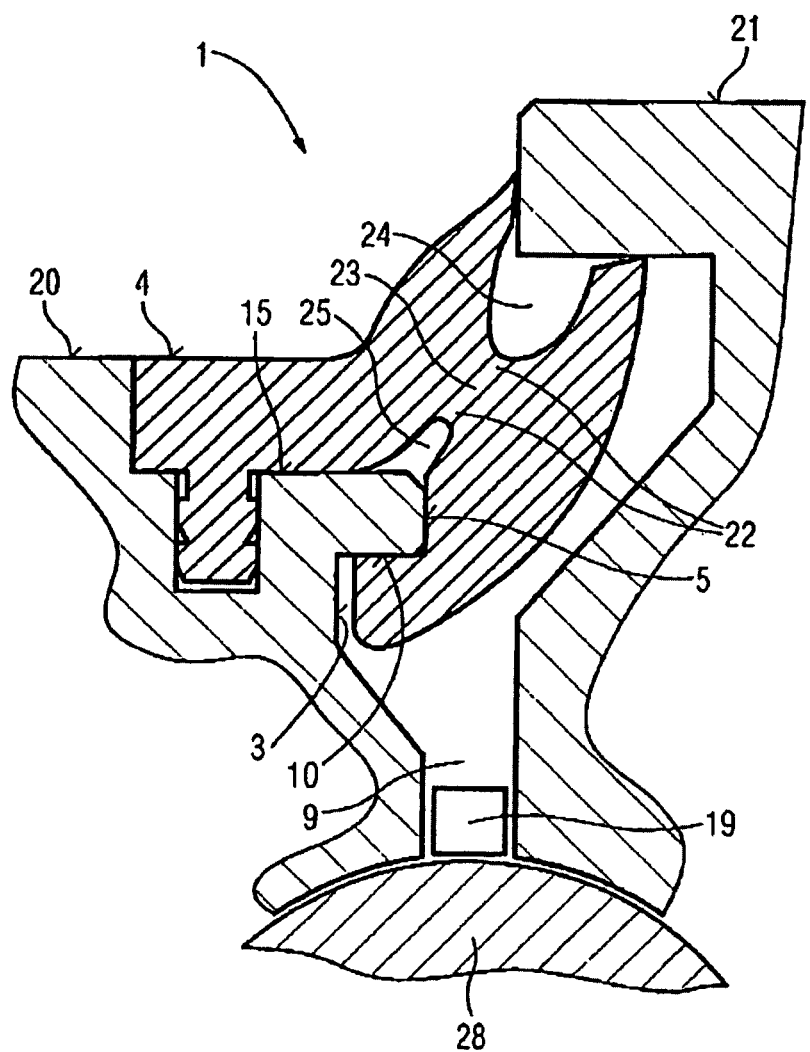
FIG. 5 is a sectional view of a still further embodiment of sealing arrangement.
Figure 6:
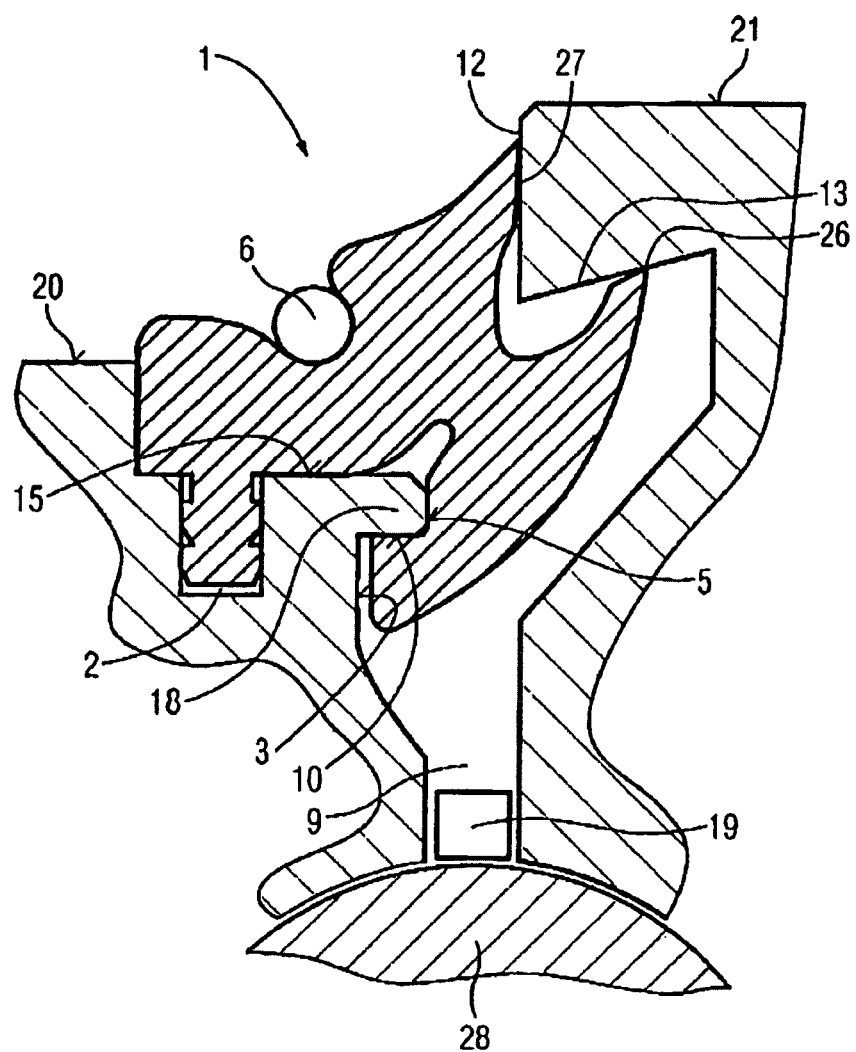
FIG. 6 is a sectional view of a still further embodiment of sealing arrangement.

FIG. 4, by contrast, shows a different variation of the surfaces 13; 14; 3; 5 bounding the sealing space in the vicinity of the sealing arrangement 1, which surfaces, as stated above, can also extend at a slant. Even a surface 15, on which the sealing arrangement 1 "rests", can be implemented as a slant.

In all the figures, FIG. 1 through FIG. 6, it can be seen that the sealing arrangement is inserted form-lockingly in the plunge cut 2 in one of two bearing components 7, for example, the outer ring, and that another consistent feature, in addition to this insertion, is the embracing of the material protrusion 18, or material undercut, the material protrusion being an integral part of the bearing component. In a further advantageous embodiment, it would also be conceivable, for example, for the material protrusion to be formed by an additional and separately introduced body disposed at the bearing component. In the present example, however, the material protrusion is created in the bearing component, for example outer ring 7, for example by the production operation of lathing. It is characteristic that the material protrusion is able to project into the sealing space, as is readily apparent in all the figures, FIG. 1 through FIG. 6.

In a further advantageous embodiment, the outer surface 5 of the material protrusion 18 is actually raised relative to the surfaces bounding the gap at the location of the sealing space 9, such that the material protrusion 18 is able to jut definitely into the bearing space. A still larger surface 10 could be formed in this way. The counterforce, or counterpressure, against axial expulsion of the seal would thus be still stronger and the fixing effect still greater. The material protrusion 18 can also be configured so that it has small dimensions relative to the dimensions of the inner space 9 to be sealed. In this way, for example, the installation process can be simplified. Generally speaking, the material protrusion 18 is dimensioned such that the sealing arrangement can be installed simply and reliably, and so that the material protrusion 18 is configured to ensure a very effective fixing.

All the figures, FIG. 1 through FIG. 6, clearly show how the barb-shaped portions of the sealing arrangement 1 are configured to achieve the form-locking and force-locking fixation of the arrangement 1 in the plunge cut 2. The seal 1 is inserted, for example, by being pressed manually into the plunge cut 2 and can also be removed manually, and thus can be replaced in the field, for example during maintenance, with a new sealing arrangement 1 of the same or a similar design. It is conceivable that in future embodiments this insertion may also take place automatically, in a specialized assembly operation. All the figures, but especially FIG. 3, clearly show the bearing-side sealing region that arcuately separates the space 9 to be sealed from the environment outside the bearing gap in which the seal is inserted.

The invention claimed is:

1. A sealing arrangement comprising a one-piece, peripheral, elastomeric sealing material for sealing a sealing space, the material containing a bearing-side sealing region and inserted between at least one outer rotatable bearing component and, mutually rotatable about the same center axis, at least one inner rotatable bearing component of a rotary joint, wherein the sealing arrangement is form-lockingly and force-lockingly connected in a detachable and replaceable manner to a structure, namely (I) to a plunge cut in a surface parallel to a horizontal outer surface of one of the inner and outer rotatable bearing components, and (II) to a projecting material protrusion with a bottom surface which is disposed on the bearing side of this material protrusion, as an integral part of the inner or outer rotatable bearing component, the sealing arrangement comprising the following elements:
   a top edge of the sealing arrangement;
   two upper sealing lips;
   an upper deformation space as a recess in the sealing arrangement;
   a bearing side sealing region;
   a barb shaped fixing portion for inserting the sealing arrangement into the bearing component;
   a region of the sealing arrangement that contacts the bottom surface on the bearing side of the projecting material protrusion;
   a lower deformation space as a recess in the sealing arrangement; wherein
   a) the top edge of the sealing arrangement is approximately flush with the horizontal outer surface of the rotatable bearing component in which the material protrusion of the sealing arrangement is present; and wherein
   b) all contact points or contact surfaces of the two upper sealing lips are either above the horizontal outer surface of the first rotatable bearing component, or all contact points or contact surfaces of the two upper sealing lips are below the horizontal outer surface of said first rotatable bearing component.

2. The sealing arrangement as in claim 1, wherein the sealing arrangement rests along an area, against the bottom, bearing-side surface of the material protrusion.

3. The sealing arrangement as in claim 2, wherein the material protrusion is bounded in a radial direction by a surface which projects from surfaces of the outer or inner rotatable bearing component in a direction toward the oppositely disposed rotatable bearing component, wherein the surfaces bound the sealing space, and, said material protrusion exhibiting small dimensions relative to dimensions of the inner space to be sealed.

4. The sealing arrangement as in claim 3, wherein the sealing arrangement gains further stabilization of its position between the bearing components by resting against surfaces at the outer rotatable bearing component and surfaces at the inner rotatable bearing component.

5. The sealing arrangement as in claim 4, wherein at least two sealing lips have different widths.

6. The sealing arrangement as in claim 5, wherein at least one of the surfaces bounding the region of the sealing arrangement, or bounding the plunge cut, as well as the outermost surfaces of the rotatable bearing components, are non-metallically or metallically coated.

7. The sealing arrangement as in claim 6, wherein at least one of the surfaces bounding the region of the sealing arrangement, or bounding the plunge cut, comprises a slanted or beveled surface.

8. The sealing arrangement as in claim 1, wherein at least one tension spring is disposed at the top edge of the sealing arrangement.

9. The sealing arrangement as in claim 8, comprising at least one additional connection screw or connection rivet introduced in that rotatable bearing component and where the material protrusion is disposed and serving to hold down the top edge of the sealing arrangement.

10. A bearing assembly having a sealing arrangement comprising:
    a rotary joint having at least one outer rotatable bearing component in the shape of a ring rotatable about an axis of rotation, and at least one inner rotatable bearing component in the shape of a ring rotatable about the axis of rotation;
    a gap formed between the outer rotatable bearing component and the inner rotatable bearing component;
    at least one sealing element disposed in the gap and sealing the gap peripherally, and substantially fluid-tightly, with respect to the environment;
    wherein at least a first one of the outer rotatable bearing component and the inner rotatable bearing component comprises at least one projecting material protrusion extending peripherally at least partway along a periphery of the regarding rotatable bearing component and configured to detachably fasten the sealing element;
    wherein the at least one sealing element is provided with a cross section configured such that the sealing element is form-lockingly and force-lockingly connected in a detachable and replaceable manner to a structure, namely (I) to a plunge cut in a surface parallel to a horizontal outer surface of the first one of the outer and inner rotatable bearing components, and (II) to the projecting material protrusion with a bottom surface which is disposed on a bearing side of this material protrusion, as an integral part of the first one of the outer and inner rotatable bearing components, the sealing element comprising the following elements:
    a top edge;
    two upper sealing lips;
    an upper deformation space as a recess in the sealing element;
    a bearing side sealing region;
    a barb shaped fixing portion for inserting the sealing element into the first rotatable bearing component;
    a region of the sealing element that contacts the bottom surface on the bearing side of the projecting material protrusion;
    a lower deformation space as a recess in the sealing element; wherein
    a) the horizontal outer surface of the first rotatable bearing component carrying the material protrusion is approximately flush with the adjacent top edge of the sealing element; and wherein
    b) all contact points or contact surfaces of the two upper sealing lips of the sealing element are either above the horizontal outer surface of the first rotatable bearing component, or all contact points or contact surfaces of the two upper sealing lips of the sealing element are below the horizontal outer surface of said first rotatable bearing component.

11. The bearing assembly as in claim 10, wherein a formation present on at least one of the outer rotatable bearing component and the inner rotatable bearing component is provided with an undercut and the shape of the cross section of the sealing element is provided with a corresponding undercut, such that a substantially form-locking connection is created by the interaction of the two undercuts, so as to prevent the sealing element from detaching in the event of an overpressure inside the gap.

12. The bearing assembly as in claim 10, wherein at least two sealing lips rest against an abutment surface of at least one of the outer rotatable bearing component and the inner rotatable bearing component to form a labyrinth seal, such that a sealing effect of the sealing element with respect to the gap is preserved when the outer rotatable bearing component and the inner rotatable bearing component are moved relative to each other.

* * * * *